United States Patent

Zimmer et al.

[11] Patent Number: 5,832,166
[45] Date of Patent: Nov. 3, 1998

[54] TERMINATING ELEMENT FOR A CENTRAL ELEMENT OF AN OPTICAL CABLE AND METHOD AND PRODUCING A TIGHT CABLE INTRODUCTION

[75] Inventors: Rainer Zimmer, Schalksmuehle; Thorsten Mueller, Menden, both of Germany

[73] Assignee: RXS Kabelg arnituren GmbH, Hagen, Germany

[21] Appl. No.: 921,983

[22] Filed: Aug. 28, 1997

[30] Foreign Application Priority Data

Aug. 28, 1996 [DE] Germany ............ 196 34 847.1

[51] Int. Cl.[6] ............................................. G02B 6/00
[52] U.S. Cl. ................................. 385/136; 385/134
[58] Field of Search ............................ 385/136, 134, 385/147, 100

[56] References Cited

U.S. PATENT DOCUMENTS

| | | | |
|---|---|---|---|
| 4,460,159 | 7/1984 | Charlebois et al. | 385/100 |
| 4,589,727 | 5/1986 | Williams | 385/136 |
| 4,674,832 | 6/1987 | Hirai et al. | 385/136 |
| 4,770,491 | 9/1988 | Champa et al. | 385/136 |
| 4,948,222 | 8/1990 | Corke et al. | 385/100 |
| 5,371,827 | 12/1994 | Szegda | 385/136 |

FOREIGN PATENT DOCUMENTS

| | | | |
|---|---|---|---|
| 31 26 718 | 2/1989 | Germany . | |
| 40-31-941 | 4/1991 | Germany | 385/134 |

*Primary Examiner*—Rodney B. Bovernick
*Assistant Examiner*—Quyen Phan Leung
*Attorney, Agent, or Firm*—Hill & Simpson

[57] ABSTRACT

A terminating element (1) for a central element (9) of an optical cable (13) comprises a sleeve (3) closed at one end for receiving the end of the central element (9) or core of the optical cable (13). An open end of the sleeve (3) is provided with a pair of flexible vanes (2) or legs having seating regions (5,6) which can be clamped onto the exterior of the cable (13) and each of the legs has free ends to help center the end of the cable and the terminating element (1) into a cable introduction (15), whose junction can be sealed by a section of a shrink hose (16) or sleeve (3).

12 Claims, 2 Drawing Sheets

TERMINATING ELEMENT FOR A CENTRAL ELEMENT OF AN OPTICAL CABLE AND METHOD AND PRODUCING A TIGHT CABLE INTRODUCTION

BACKGROUND OF THE INVENTION

The present invention is directed to a terminating element for a central element or core of an optical cable and a method for producing a tight cable introduction.

German 37 26 718-A1 discloses an appliance for attaching a mechanical connection to a cable cladding of an optical cable. A clamp mechanism is employed that is arranged inside a sleeve in the splicing space. The central element is intercepted with the assistance of this clamp mechanism.

SUMMARY OF THE INVENTION

An object of the present invention is to create a terminating element for a central element of an optical cable that can be arranged directly in the introduction region of the cable sleeve, wherein the central element is prevented from migrating out and a contact with the cable shielding as well as the central element is provided.

This object is achieved with a terminating element, which has a tubular sleeve closed at one end for receiving the end of the central element or core element and has flexible vanes or legs extending from the opposite open end of the sleeve. The vanes have the shape of seating regions adapted to engage the cable cladding, wherein at least one of the seating regions can be bent into the form of a U-shaped receptacle for engaging a tab cut in the cable cladding, and the sleeve is provided with resilient lugs or prongs to form retaining elements for fixing and contacting the central element and the terminating element is used with a clamping means for clamping the seating regions onto the cable cladding.

Another object of the invention is to find a method for producing the cable introduction with the assistance of a terminating element. This object is achieved by a method for producing a tight cable introduction with a terminating element for fixing the central element (9) of an optical cable, said method including the steps of providing longitudinal cuts in the cable cladding to produce a cable cladding tab at the end of the cladding, introducing the cable cladding tab into a U-shaped receptacle of the terminating element as the end of the central element is introduced into a sleeve of the terminating element, applying vanes extending from one open end of the sleeve of the terminating element with their seating regions in contact with the exterior surface of the cable cladding and clamping these seating regions onto the cladding, centering the cable, with the assistance of the free ends of the vanes, within a cable introduction and then shrinking a shrink hose section or tube onto the cable introduction and the cable in a sealing fashion.

The advantages of fashioning the terminating element according to the present invention can be seen in that the extremely fast and unproblemmatical mounting is possible, since the element is composed of only one component part and the fixing element merely has to be additionally utilized. In addition, all components required for contacting the central element and the cable shielding of the optical cable are united in this single component part. An adaptation to different diameters is easily possible by utilizing the spring material of each of the retaining elements. The contacting can be unproblemmatically designed with the assistance of flexible contact springs. The retainer elements of the sleeve are in the form of prongs, for example formed by inwardly-directed cut-outs punched from the sleeve that serve the purpose of seizing the central element, and these are spread onto the introduced central element and fixed in such a way. As a result of the narrow structure of the terminating element, the light waveguide leads of the optical cable can be conducted out without any impediment. The design of the fixing elements allows simple possibilities for fixing the arrangement in a cable introduction region of a cable fitting so that the employment of a shrink hose section can provide a covering seal, which is very helpful. As a result of this structure, it is also possible that the terminating element can be accommodated directly in the introduction region, so that no space need to be made available in a splicing space.

Other advantages and features of the invention will be readily apparent from the following description of the preferred embodiments, the drawings and claims.

DESCRIPTION OF THE PREFERRED EMBODIMENTS

Figure 1:
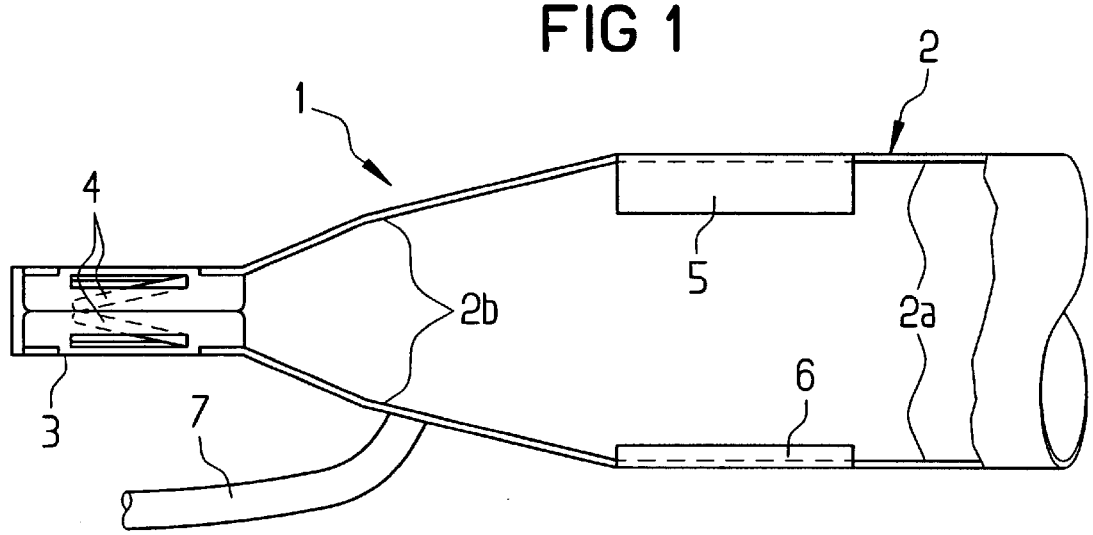
FIG. 1 is a schematic side view of a terminating element in accordance with the present invention.
Figure 2:
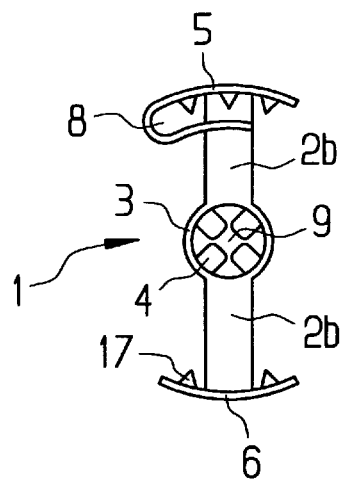
FIG. 2 is an end view of the terminating element of FIG. 1.
Figure 3:
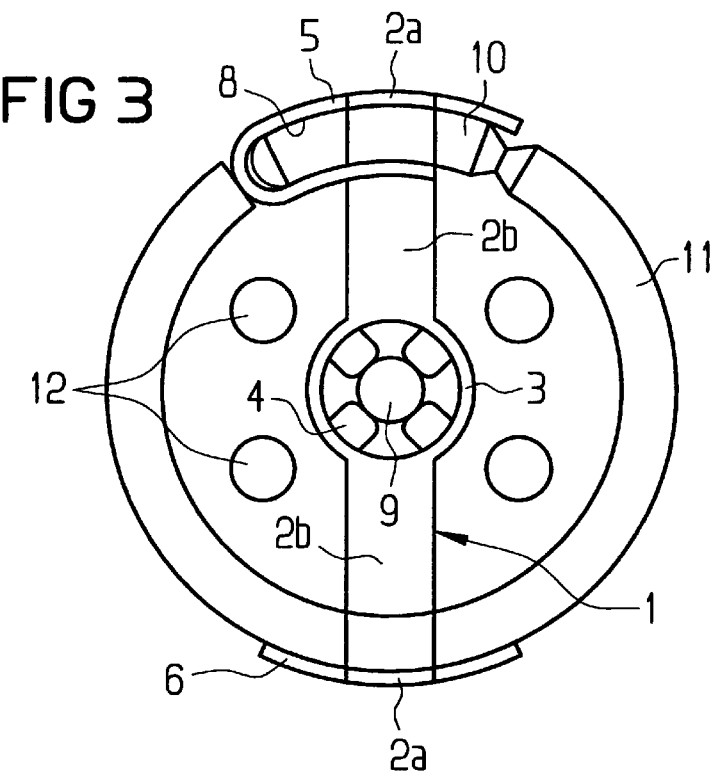
FIG. 3 is an end view of the terminating element mounted on the end of a cable.

The principles of the present invention are particularly useful when incorporated in a terminating element, generally indicated at 1 in FIGS. 1, 2 and 3. The element 1 is composed of a cylindrical sleeve 3, which is closed at one end and has an open end provided with two elongated vanes or legs. In this application, each of the vanes 2 has a portion 2b which is conically bent expanding outward and can be adapted to the respective cable diameter by being bent so that the cable in seating regions 5 and 6 of each of the vanes will correspond to the cable diameter. These seating or acceptance regions 5 and 6 are applied to the shape of the cable cladding with their seating surfaces. The terminating element 1 is then fixed with the assistance of a clamp element that will embrace the acceptance regions 5 and 6 and press them against the cable cladding, which is not illustrated in FIGS. 1 and 2. The acceptance region 5, however, is also shaped with a U-shaped receptacle into which a cable cladding tab can be introduced. Each of the legs or vanes 2 has a free end 2a which can be bent back in an outward manner onto the surface of a cable introduced into the element, so that the centering and fixing can be undertaken in the cable introduction. The central element of the optical cable is introduced into the sleeve 3 until it is stopped at the closed end and then is fixed by resilient retaining elements that act on the circumference of the central element, so that migration of the central element, which migration can occur given temperature fluctuations, is prevented. It is also indicated that a connection 7 for the contact to a ground is provided.

A front view of the terminating element 1 shows the U-shaped receptacle 8 of the seating region 5. The cable cladding tab, such as 10 (FIG. 3), is formed by two parallel, longitudinally-directed cuts into the cable cladding and the tab is then introduced into the receptacle 8 for fixing the cable. Inwardly-directed prongs or teeth 17 are provided by V-shaped cuts into seating regions 5 and 6 and these V-shaped prongs or teeth enhance the grip and simultaneously produce a contact with the cable shielding. The lower acceptance region 6 also has teeth and prongs 17 and is circularly bent into a portion of a cylinder to be adapted to the cable cladding.

The sleeve 3 has inwardly directed, resilient retainer elements 4, which are shown as four flexible prongs or legs that are inwardly directed so that the migration of the central element is prevented. The adaptation of the various diameters of the central elements 9 occurs due to the flexibility of these prongs 4.

In the mounted condition of the element 1, the cable cladding tab 10 is introduced into the U-shaped receptacle 8 that is formed in the seating region 5 of the element 1. The shapes of the seating regions 5 and 6 are matched to the cable cladding 11. The light waveguides 12 are indicated in the inside of the cable, and the central element 9 of the cable is fixed on the inside of the sleeve 3 by the prongs 4, which are fashioned as retaining elements.

Figure 4:
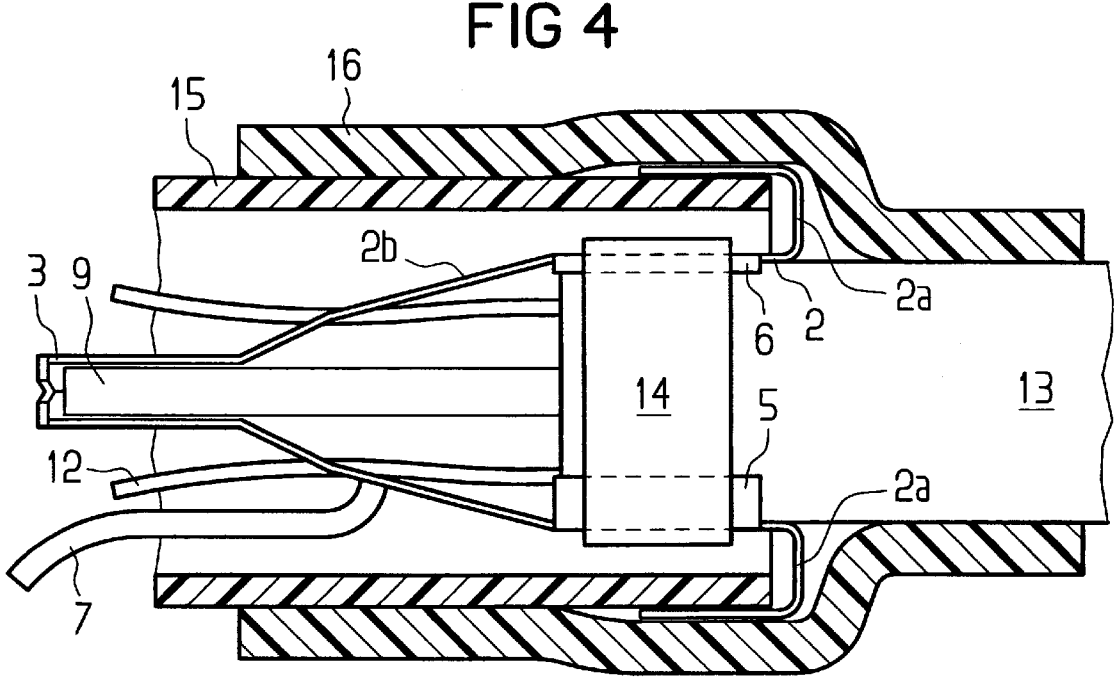
FIG. 4 is a cross sectional view through an introduction region of a cable fitting utilizing the terminating element.

In FIG. 4, the terminating element 1 along with the end of a cable 13 is illustrated as being mounted in a cable introduction 15. To accomplish this, the mounting is implemented in the following steps. First, the cable end is correspondingly offset and the central element 9 is introduced into the sleeve 3 of the terminating element 1, where it is fixed by the prongs 4, which are not shown in FIG. 4. The attachment ends 2b of the vanes 2 attached to the sleeve 3 are bent in such a manner that the seating regions 5 and 6 can be placed on the cable 13. A clamping element 14, for example a strap retainer or a spiral spring, with which the required seating pressure is produced is then pulled over these seating regions 5 and 6 and fastened to clamp the seating regions onto the exterior of the cable 13. Subsequently, this assembled unit is introduced into the cable introduction 15 and is centered in the outward direction in the cable introduction by bending over the free ends 2a of the vanes 2. Finally, a shrink hose section 16 is shrunken in a sealing fashion over this region. The light waveguides 12 and the connection 7 for the ground contact are also shown in this Figure.

Although various minor modifications may be suggested by those versed in the art, it should be understood that we wish to embody within the scope of the patent granted hereon all such modifications as reasonably and properly come within the scope of our contribution to the art.

We claim:

1. A terminating element for a central element of an optical cable, said terminating element comprising a sleeve closed at one end for accepting the end of a central element of the optical cable, flexible vanes extending from an open end of the sleeve, each of said vanes having a seating region matched to the shape of the cable cladding, one of said seating regions being bent to form a U-shaped receptacle for a cable cladding tab formed in the cable cladding, resilient means forming retaining elements being arranged in the sleeve for fixing and contacting the central element and clamping means for clamping the seating regions onto the cable cladding.

2. A terminating element according to claim 1, wherein the vanes are arranged to conically diverge from the open end of the sleeve in a fitting region.

3. A terminating element according to claim 1, wherein free ends of each of the vanes are bent back onto the outside of a cable introduction for fixing and centering the central element therein.

4. A terminating element according to claim 1, wherein the clamping means comprises a strap retainer.

5. A terminating element according to claim 1, wherein the clamping means comprises a spiral spring.

6. A terminating element according to claim 1, which further includes an electrical connection for the terminating element.

7. A terminating element according to claim 6, wherein the electrical connection is provided on one of the flexible vanes.

8. A terminating element according to claim 1, wherein the retaining elements of the sleeve are formed by inwardly-directed punched-out prongs which are spread onto the central element.

9. A terminating element according to claim 1, wherein a section of a shrink hose is provided for sealing the point of introduction of the optical cable into the terminating element.

10. A terminating element according to claim 1, wherein each of the seating regions has inwardly-directed prongs for establishing contact with the cable cladding.

11. A terminating element according to claim 1, which further includes a terminal for forming a ground contact.

12. A method for producing a tight cable introduction with a terminating element for fixing a central element of an optical cable, said method comprising the steps of cutting the cable cladding of the cable in the longitudinal direction at an end to form a cable cladding tab, introducing the cable cladding tab into a U-shaped receptacle of the terminating element and introducing the end of a central element of the cable into a sleeve of the terminating element, moving vanes of the terminating element so that seating regions of the vanes are fixed in contact fashion with the assistance of a clamping element on the outside of the cable cladding, centering the cable utilizing the assistance of the free ends of each of the vanes within the cable introduction and then forming a seal by shrinking a section of a shrink tubing onto the cable introduction and cable.

* * * * *